Aug. 28, 1945. D. R. SCANLAN 2,383,821
APPARATUS FOR ARTIFICIAL RESPIRATION
Filed Feb. 7, 1939 9 Sheets-Sheet 1

INVENTOR
DENNIS R. SCANLAN
BY
ATTORNEY

Aug. 28, 1945.   D. R. SCANLAN   2,383,821
APPARATUS FOR ARTIFICIAL RESPIRATION
Filed Feb. 7, 1939   9 Sheets-Sheet 4

INVENTOR
DENNIS R. SCANLAN
BY
ATTORNEY

FIG.16.

Aug. 28, 1945. D. R. SCANLAN 2,383,821
APPARATUS FOR ARTIFICIAL RESPIRATION
Filed Feb. 7, 1939 9 Sheets-Sheet 8

INVENTOR
DENNIS R. SCANLAN
BY M Philip Churchill
ATTORNEY

Aug. 28, 1945.　　　D. R. SCANLAN　　　2,383,821
APPARATUS FOR ARTIFICIAL RESPIRATION
Filed Feb. 7, 1939　　9 Sheets-Sheet 9

INVENTOR
DENNIS R. SCANLAN
BY M. Philip Churchill
ATTORNEY

Patented Aug. 28, 1945

2,383,821

UNITED STATES PATENT OFFICE 2,383,821

APPARATUS FOR ARTIFICIAL RESPIRATION

Dennis R. Scanlan, St. Paul, Minn.

Application February 7, 1939, Serial No. 255,009

11 Claims. (Cl. 128—30)

This invention relates to apparatus for inducing and maintaining the respiration of a person. More particularly, the invention concerns respirating apparatus providing a patient with considerable freedom of movement, said apparatus being light in weight, readily portable, and capable of maintaining respiration closely approaching natural breathing.

Artificial respirators have been used heretofore for the purpose of causing breathing by moving the chest walls to expand and contract the chest when the chest muscles which normally serve this function have ceased to function. One form of such apparatus known as the "iron lung" completely encloses the body except for the head, and by means of a vacuum producing device, vacuum and pressure are alternately applied inside the "iron lung" to expand and contract the chest of the patient within it. Persons required to spend considerable time in such a device do not have an opportunity to move and exercise the arms or legs with any degree of freedom, and are not able to sit up. Such persons eventually develop kidney or digestive tract ailments by reason of their continuous horizontal position, and are not given an opportunity to restore the operation of muscles by exercise because of their confinement. Attempts have been made heretofore to provide respirating apparatus enabling a person to lie down or sit up and to provide greater freedom for the limbs, but such attempts have been no more than partially successful.

It is an object of this invention to provide respirating apparatus capable of maintaining a natural breathing cycle for a person and, at the same time, permitting the patient the use of his limbs.

Another object of the invention is to provide an artificial respirator covering a patient only from the top of the chest to the lower portion of the abdomen, leaving the arms, legs and neck entirely free.

A further object of the invention is to provide a respirator which is light in weight, which permits the patient using it to lie down, sit up, or assume an intermediate position at will.

Another object of the invention is to provide an artificial respirator enclosing the chest and abdomen, or a portion thereof, which is automatically sealed when air is withdrawn from the respirator without the necessity of using straps or other tight fitting means, and which provides access of air during the breathing cycle to all portions of the skin enclosed within the respirator.

A still further object is the provision of vacuum producing means for use with a respirator capable of producing a gradual as distinguished from a sudden application of vacuum and/or pressure to simulate as closely as possible a natural breathing cycle.

Another object of the invention is the provision of a vacuum producing device capable of being operated automatically or by hand to apply alternately a vacuum to a respirator and to release the vacuum, or to apply positive pressure instead of merely breaking the vacuum if such positive pressure is needed.

The invention will be more fully understood from the following description of the embodiments thereof illustrated in the drawings, in which—

The respirator illustrated in Figures 1 to 15, inclusive, comprises a rigid cuirass-like chest plate 25 having a body encircling band of flexible material 26 secured to its lower end. The back or underneath portion of the respirator may be formed from sheets of flexible material 27, 27 each permanently and tightly secured to the sides to the rigid chest plate 25. The lower ends of the back members 27 may be conveniently made integral with and form a part of the sealing band 26. The rigid chest plate 25 is provided at each side with rigid extensions 28 which may be clamped to the spring 29 of a bed or to any other suitable support therefor. This respirator may be connected through a flexible hose 30 to a suitable vacuum producing device 31. The rigid chest plate portion 25 of the respirator is preferably formed in the shape of a person's chest in expanded position, and may be adjusted and clamped at any desired height above a mattress 32 or other support upon which a person may be lying, so that the inner surface of the plate 25 and the portion of band 26 adjacent thereto are at all times spaced from the chest and stomach of the person using the respirator. The back of the patient rests on the back members 27 which may comprise two fairly thick sheets of soft rubber, preferably a soft cellular latex provided on its outer surface with a substantially air tight skin of rubber or similar material to prevent rapid leakage of air therethrough. These two sections 27 forming the back may be connected together by suitable closure means such as the zipper 33, which provides a convenient means for quickly putting on and taking off the respirator.

The flexible band 26 of the respirator which should extend down over the patient's hips is preferably made of a sheet sponge rubber having a cellular structure similar to the back members, which is secured to the lower edge of the plate 25 in overlapping relationship therewith, as indicated at 34. This lower flexible section 26 may be made integral with, or may comprise one or more sections of sheet material attached to the back members 27 below the lower end of the chest plate 25. A portion of the flexible section 26 adjacent the edge 34 is preferably stiffened, or it may be made as a separate semi-rigid section, either through the use of suitable semi-rigid material, or by providing stiffening wires extending circumferentially of the enclosure such as indicated at 35 for the flexible section 26. This provides a desirable sealing effect when air is withdrawn from the respirator without applying undue pressure directly on the abdomen of the patient.

At the upper end of the respirator there may be secured inside the edge of the plate 25 one or more suitably shaped pieces of flexible material 36, preferably of cellular latex material similar to the back sections 27 and the lower section 26. The sealing pieces 36 are shaped to conform to the body of the patient from just beneath one arm pit around over the upper portion of the body just below the neck to a point beneath the other arm pit. Flexible sponge rubber tabs are thus formed which lie reasonably snugly against the skin of the person using the respirator providing sealing means at each end of the chest plate 25.

Referring particularly to Figures 1 to 9, the depending extensions 28 of the chest plate 25 may be provided with square openings 37 adapted to register with the slots 38 in the elongated strap members 39. Bolts 40 may be passed through these openings and held in place by wing nuts 40a to clamp the portions 28 to strap members 39. At their lower ends, strap members 39 may be provided with holes through which they are clamped to the brackets 41 by bolts 42 and wing nuts 43. Brackets 41 may be removably or otherwise secured to plates 44, formed as a part of the bed-spring, by means of suitable bolts and nuts 44a. Plates 44 are preferably provided with parallel rows of holes 44b to facilitate clamping of respirators of different widths thereto.

The chest plate 25 has a fixed pipe connection 45 at one side thereof which communicates with a conduit 46 attached inside the chest plate and having a screen covered opening 47 approximately in the center of the respirator. I have found that by providing opening 47 in the center of the enclosure the patient is not pulled sideways or caused to roll as may happen with this opening at one side. If desired, a valve 48 may be provided in the pipe 45 for attaching a manometer 49. The flexible hose 30 is preferably made in the form of a long bellows out of molded rubber so that it has a considerable degree of flexibility and thus serves to absorb any sudden application of vacuum or pressure to the inside of the respirator, making the change in pressure more gradual.

Figure 1:
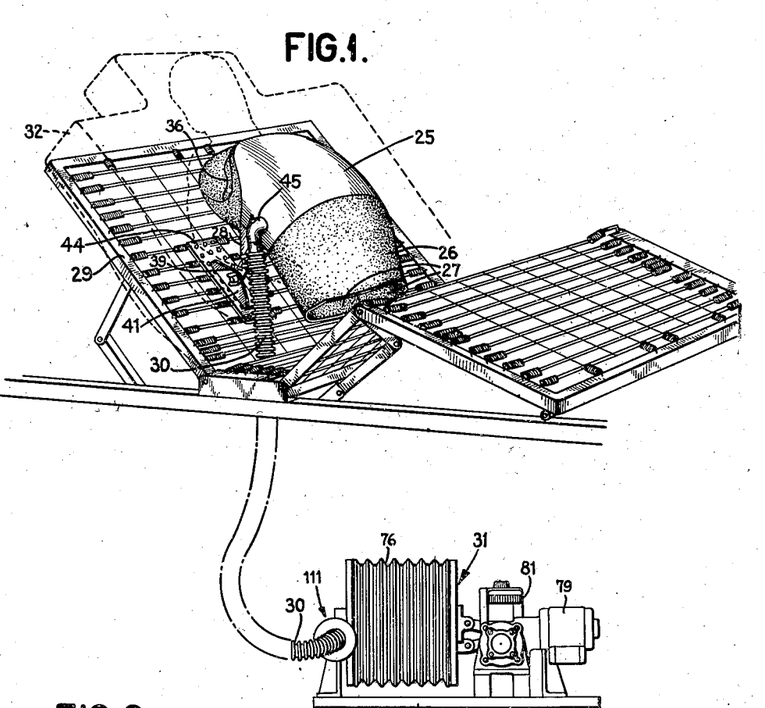
Figure 1 is a perspective view of a bed-spring equipped with a respirator in accordance with my invention, said respirator being connected to a vacuum producing device shown in elevation.
Figure 2:
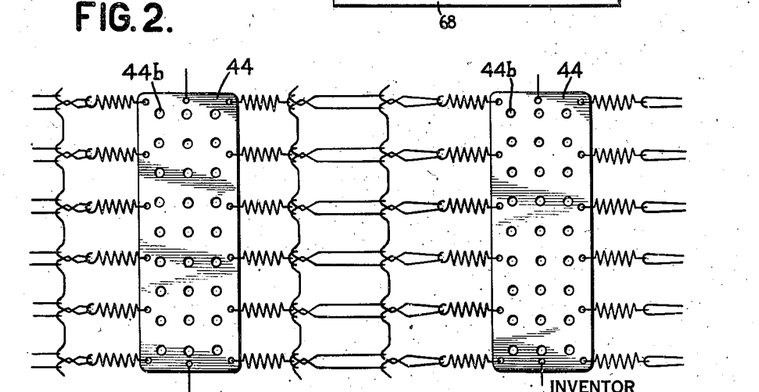
Figure 2 is a plan view of a section of the bed-spring showing plates to which the respirator may be secured.
Figure 3:
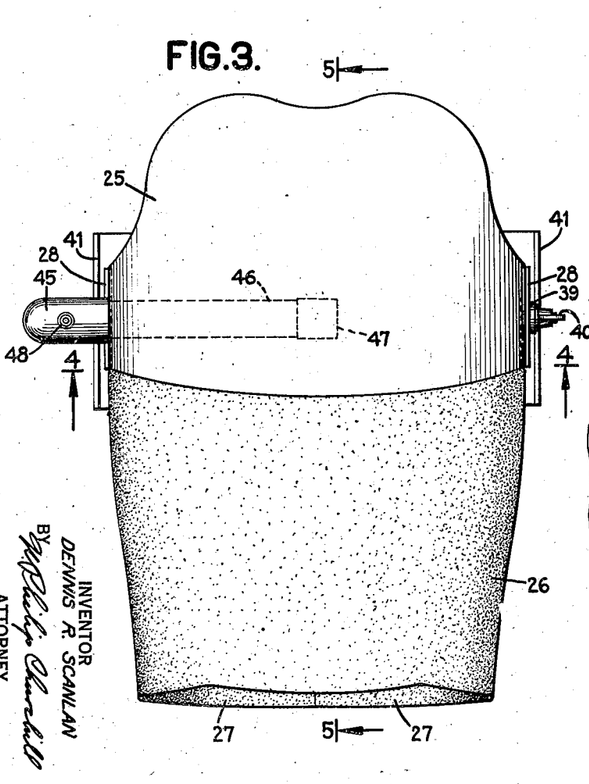
Figure 3 is a top plan view of the respirator.
Figure 4:
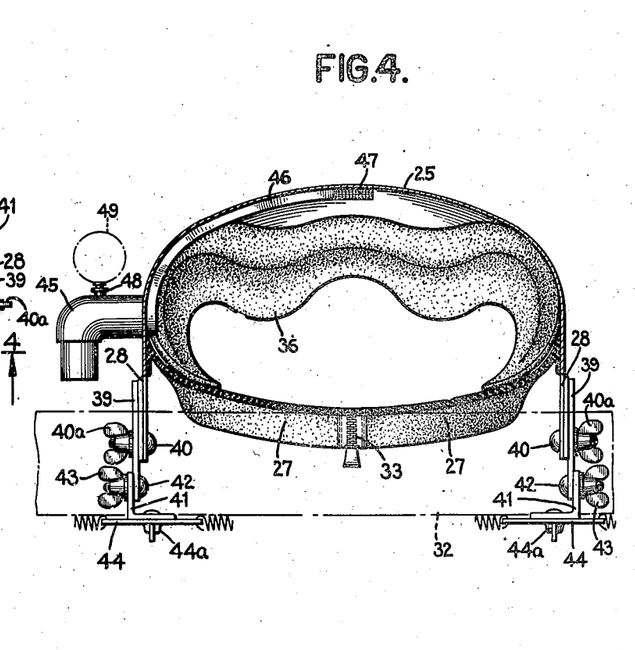
Figure 4 is a vertical section through the respirator taken on the line 4—4 of Figure 3.
Figure 5:
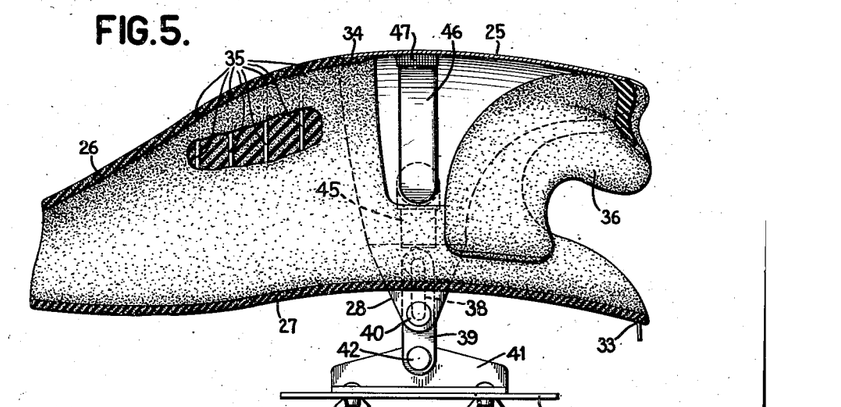
Figure 5 is a longitudinal vertical section through the respirator taken on the line 5—5 of Figure 3.
Figure 6:
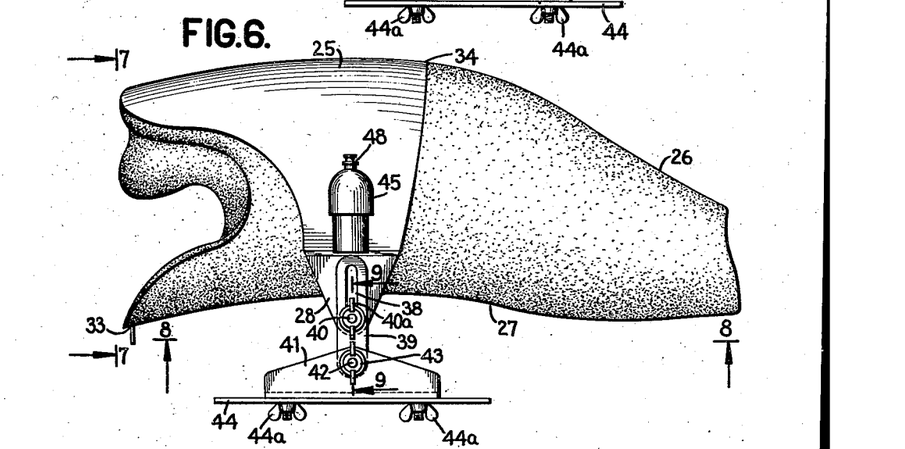
Figure 6 is a side elevation of the respirator shown in Figure 3.
Figure 7:
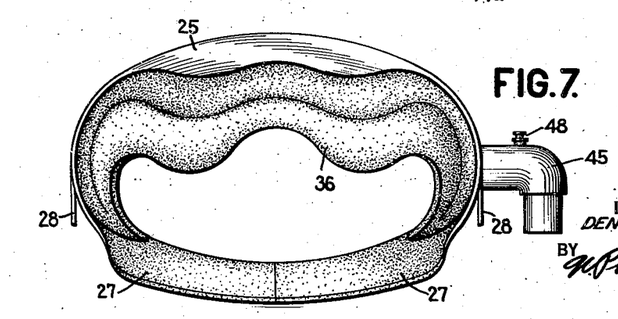
Figure 7 is an end elevation of the respirator taken on the line 7—7 of Figure 6.
Figure 8:
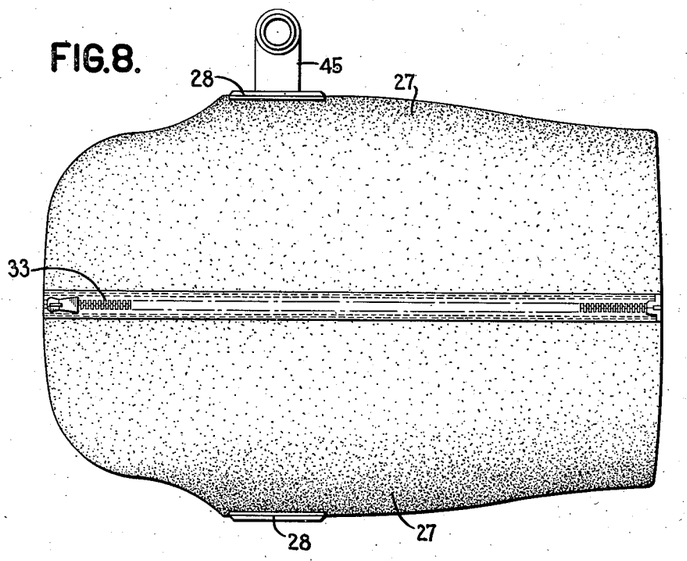
Figure 8 is a bottom plan view of the respirator taken on the line 8—8 of Figure 6.
Figures 9, 10:
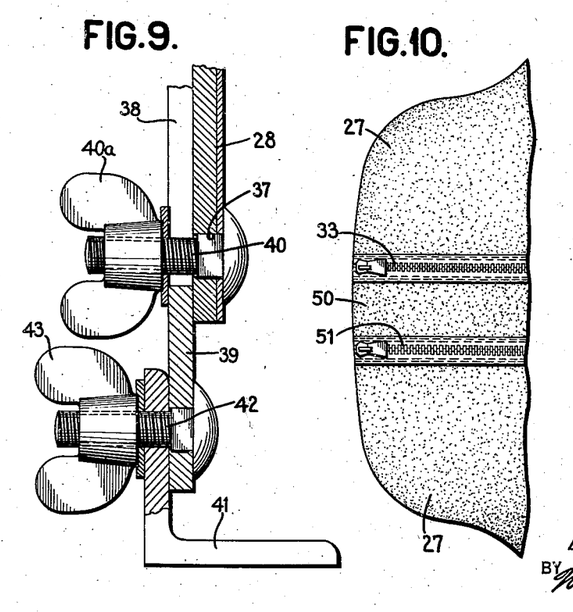
Figure 9 is a section of a detail showing the connection of the respirator to the bed-spring on an enlarged scale, and taken on the line 9—9 of Figure 6.
Figure 10 is a fragmentary bottom plan view of the respirator similar to Figure 8 but illustrating a modification thereof.

Figure 10 illustrates how the back members 27 of the respirator may be adjusted to fit different patients of different sizes by inserting a piece 50 of any desirable width equipped with a second slide fastener 51 or other closure means. The section of material 50 does not need to be flexible, although it is preferably made of the same material as the main back sections 27 for the comfort of the patient.

Figure 11:
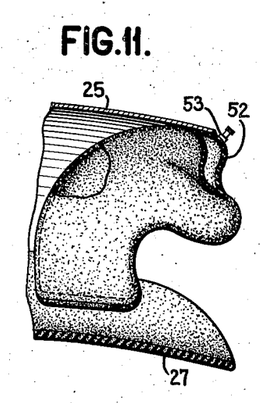
Figure 11 is a fragmentary vertical section similar to Figure 5 but showing a modified form of sealing means for the respirator.
Figures 12, 13, 14, 15:
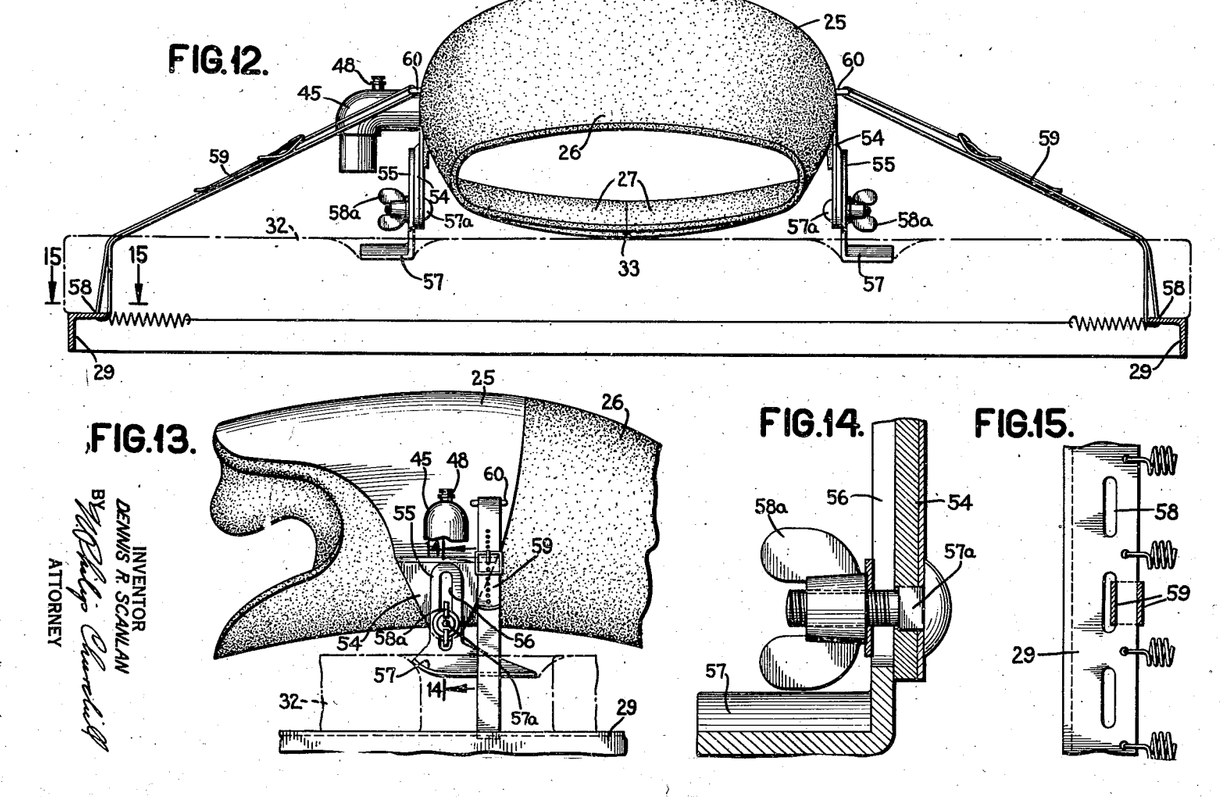
Figure 12 is an end elevation of the respirator illustrating a modified connection thereof to a bed, bed-spring, or other support.
Figure 13 is a side elevation of the respirator shown in Figure 12.
Figure 14 is a detail of one portion thereof taken on an enlarged scale and on the line 14—14 of Figure 13.
Figure 15 is a section showing a detail of a modified means for securing the respirator to the bed taken on the line 15—15 of Figure 12.

A modified form of sealing means for the respirator is illustrated in Figure 11 as applied to the upper end thereof. This modified seal comprises a pneumatic container 52 which is secured to the inside of the chest plate 25 and to the sides of the back sections 27 in place of the piece of flexible material 36. This pneumatic container 52 may be inflated to the desired degree through a suitable valve 53, thus providing the respirator with considerable flexibility in fitting it to different sized bodies. One or more of these pneumatic containers may be employed if desired, and they may be used at either or both ends of the respirator.

Figures 12 to 15 illustrate a modified form of support for the respirator. In this modification, the chest plate 25 is provided with depending extensions 54 at its sides which are clamped to the shoe members 55 provided with vertical slots 56 by means of bolts 57a and wing nuts 58a. Shoe members 55 have flattened lower surfaces or feet 57 which are adapted to rest directly on a suitable support. The shoes 55 may be supported by the mattress as illustrated or they may extend through the mattress and be supported by the spring. A substantial support for the shoe members 55 is needed because they indirectly support part of the patient's weight due to the hammock-like effect of the back sections 27. To hold the respirator in place when the patient is not lying down, the bed-frame or spring may be provided at its sides with slots 58 to receive the adjustable straps 59 which are also passed through rings 60 fixed to the side of the chest plate 25.

The respirator is easily arranged in place on a patient by simply placing the enclosure over the patient's chest and closing the interlocking slide fastener 33. If the patient's chest is large enough to require it, one or more back sections 50 may be secured in place at this time. The patient and respirator are then placed so that the side extensions 28, strap members 39 and brackets 41 may be clamped together in place. Brackets 41 may have been previously fixed to the plates 44 the necessary distance apart to receive the strap members 39 and extensions 28. The respirator should be adjusted and clamped in place so that at least a portion of the patient's weight is suspended from the chest plate 25 by the back sections 27. This ensures a suitable natural sealing action between the back of the patient and back sections 27. The two bolts 40 and 42, and their wing nuts 40a and 43 provide for both a vertical and a rocking adjustment of the respirator with respect to the bed-spring facilitating the initial correct positioning of the respirator and also any adjustment that may be needed when a patient changes from a reclining to a sitting or intermediate position.

When the arrangement of Figures 12 to 15 is employed, the supports 55 are adjusted so that a portion of the patient's weight is carried by the back members 27. For this purpose, the feet 57 of the shoes 55 should have a sufficient area to prevent them from sinking too deeply into the mattress, thus avoiding excessive movement of the respirator on the intake of the negative pressure. If the respirator is not firmly supported, the intake of negative pressure pulls the respirator down instead of producing the desired action of drawing the chest muscles up. The mattress and spring or other support for the feet 57 should be sufficiently firm and hard to prevent such excessive movement of the respirator, and for this purpose it may be desirable to position the feet 57 on the mattress over plates in the spring such as the plates 44. Straps 59 are not needed as long as the patient is lying down but may be needed to hold the respirator in place when the patient is raised to a sitting or partial sitting position. If the respirator fits the patient snugly over the upper chest, these straps may even be omitted in a partial sitting position.

The respirator may now be connected to the vacuum producing device 31, or to a manually operated device if such is to be used, by attachment of the rubber hose 30 to the pipe connection 45. The vacuum producing device, as described more fully hereinafter, alternately withdraws air from the respirator to produce a partial vacuum therein and releases this vacuum or applies positive pressure as may be needed. For most purposes such positive pressure is not necessary because the patient's chest will drop by gravity or with the aid of the chest muscles, if these muscles have not wholly ceased to function, when the vacuum is released. The proper amount of vacuum may be adjusted in accordance with readings of the manometer 49.

When air is first withdrawn through conduit 46, connection 45 and the hose 30, some leakage of air into the respirator occurs around the flexible portions 26 and 36. A small amount of leakage is desirable since it supplies air to the confined portions of the patient's skin preventing skin disorders from developing, and because it cushions the development of vacuum inside the respirator. As the pressure inside the respirator decreases, the members 26 and 36 become more effective as sealing means. Due to the semi-rigid or stiffened portion of section 26, the fully flexible portion presses against the patient in a direction more towards the patient's head than at right angles to the body. After the chest has been fully expanded, air is allowed to flow into the respirator through the connection 45 and conduit 46, and the chest of the patient drops by reason of its own weight to expel the air that has been drawn into the lungs during expansion.

Any of various materials may be employed for the rigid chest plate 25 provided they have sufficient rigidity to hold their shape during operation of the device and are reasonably light in weight. Such materials as aluminum or hard rubber are suitable for this purpose. If desired, the chest plate 25 may be provided with a transparent section or window. Plastics may also be employed for the chest plate 25, the synthetic transparent resin known as "lucite" being particularly well adapted for the chest plate because of its property of transmitting ultra-violet rays. It is particularly advantageous to use materials such as aluminum or other materials through which X-rays may be applied to the body, or materials through which ultra-violet rays or infra-red rays will penetrate in order that the patient may be treated with them while in the respirator.

It will be apparent that a patient within the respirator of my invention is able to move his body to some degree, rolling it slightly from side to side. Since the rapidity with which the flexible members 36 and 26 form a seal as the vacuum is applied determines the amount of vacuum ultimately applied in the cycle, and also the rapidity with which the vacuum becomes effective, the patient is able, by moving slightly, to render this sealing more or less effective and thus vary the character of the breathing caused by the respirator.

I have discovered that when a patient is in a sitting position, or in a partial sitting position, less vacuum is necessary to produce correct breathing than when the patient is lying down. For example, when the patient is lying down, it is usually desirable to apply a vacuum which may vary from 18 to 22 cm. of water. When the patient is moved to a partial sitting position however, only about two-thirds of this vacuum, that is about 12 to 15 cm. of water, is necessary to produce the same amount of breathing.

Figure 16:
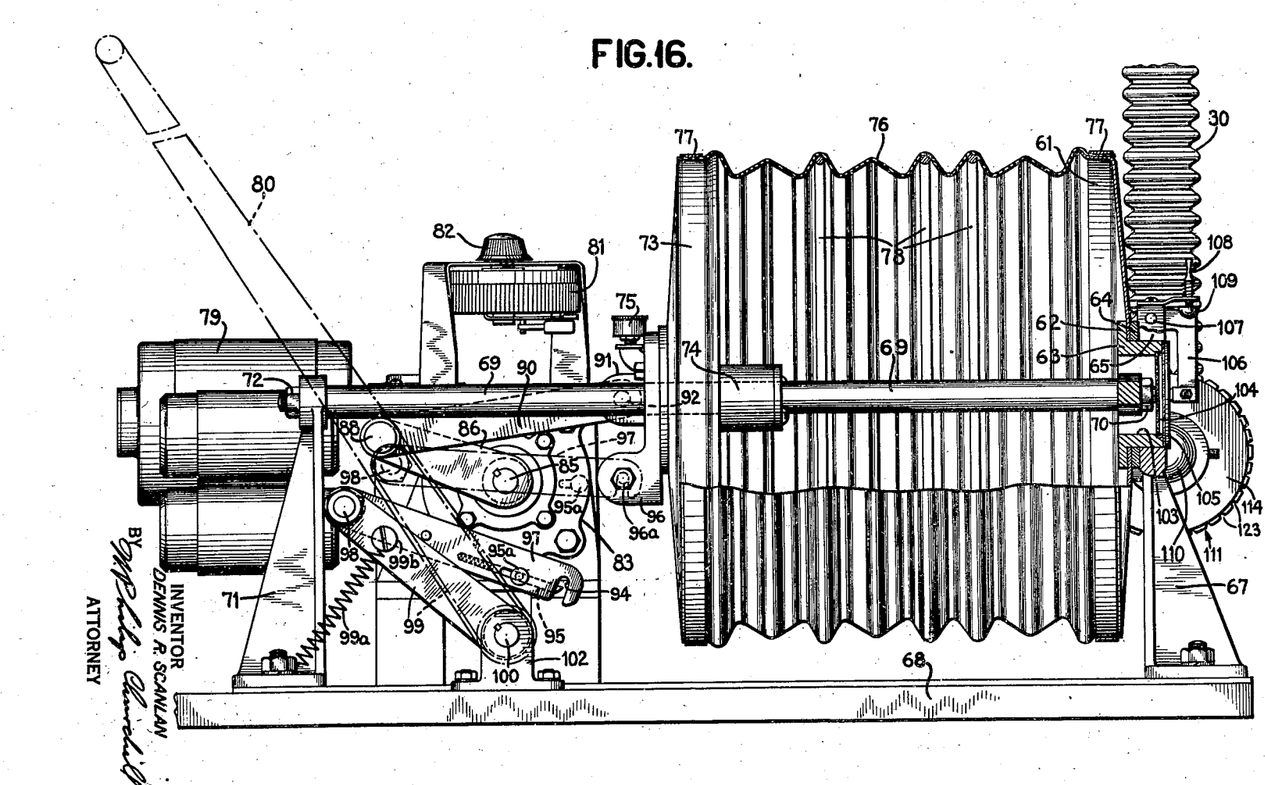
Figure 16 is a side elevation partly in section of a motor driven vacuum producing device for use with a respirator.
Figure 17:
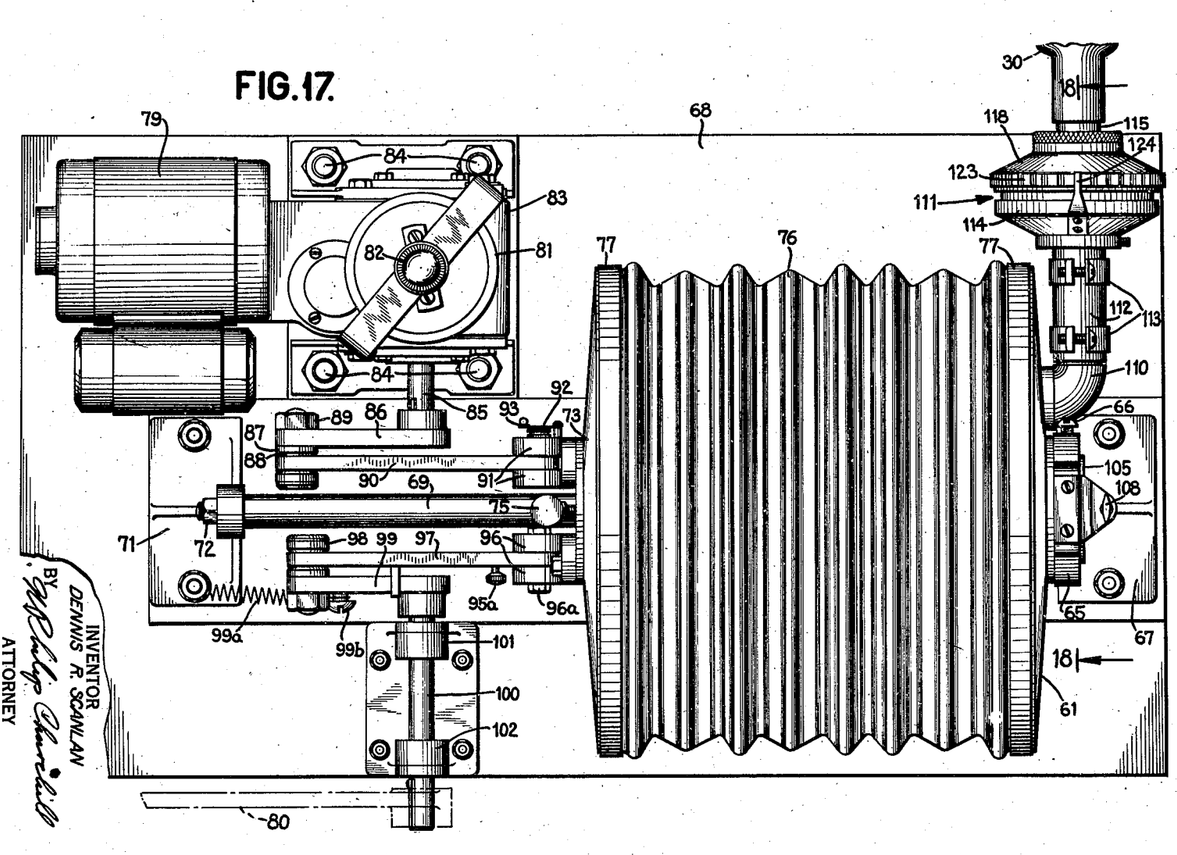
Figure 17 is a top plan view of the vacuum producing device shown in Figure 16.
Figure 18:
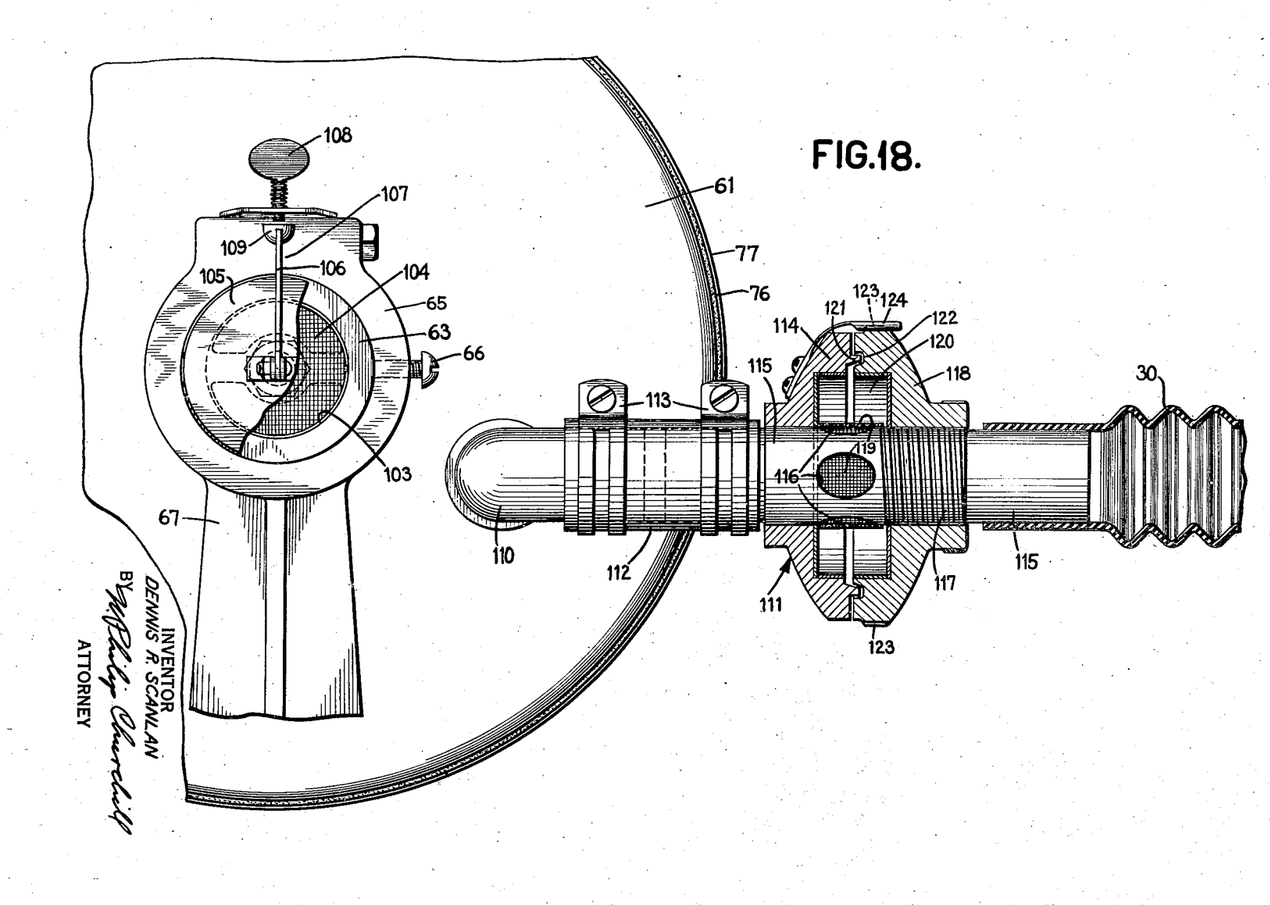
Figure 18 is a fragmentary sectional view taken on the line 18—18 of Figure 17.

The vacuum producing device illustrated in Figures 16 to 18, inclusive, includes a bellows constructed with a fixed annular member 61 which is clamped between a flange 62 of the housing member 63 and the washer 64 which is held in place by the ring 65. Ring 65 may be secured on the housing member 63 by means of the set screws 66. Housing member 63 may be formed integrally with or supported by separate standards 67 secured to any suitable base 68. Supported within the housing member is a horizontal rod 69 with one end secured to a mounting therefor on the housing member 63 by means of the nut 70. The other end of rod 69 may be supported by the standard 71 and secured in place by the nut 72. A second disc member 73 is provided with a suitable centrally disposed stuffing box 74 and arranged to slide on the rod 69. Lubrication for the stuffing box may be supplied through lubricating cup 75. The end members 61 and 73 of the bellows are each formed with flanges extending toward each other, and the ends of a molded rubber bellows 76 may be clamped over these flanges by means of the metal clamping bands 77. The rubber bellows 76 is preferably molded out of rubber in the shape of a thin-walled bellows and its rigidity or flexibility as it is opened and collapsed may be varied at will by the use of a number of internal spring steel expanding rings 78. The number and position of these rings determines the force and speed with which the vacuum is produced by the machine.

The reciprocating end of the bellows may be operated by a motor 79 or by a hand lever 80. Motor 79 may be any suitable electric motor, preferably one operating on either A. C. or D. C. current, and the current may be supplied to it through the rheostat 81 operated by rotating knob 82. Rotation of the knob 82 may, if desired, serve to turn the motor on and off, as well as to vary the current supplied to the motor and thus alter its speed as desired. A gear reducing unit 83 may be fixed to the base 68 by means of the bolts and nuts 84 and driven by the motor 79. The low speed shaft 85 of the gear reducing unit 83 may have splined or otherwise secured thereto a crank arm 86. The outer end of the crank arm has fixed thereto a knob 87 made in two sections with a circumferential groove 88, and held in place by the nut 89. Link 90 has one end fitted over the knob 87 for rotation in the groove 88. The other end of link 90 may be rotatably connected to the bifurcated arm 91 fixed to the end of member 73 by means of the pin 92. In order to disconnect the link 90 from the bifurcated arm 91, a simple latch 93 may be provided which can be swung to one side, permitting withdrawal of pin 92. This link 90 should be disconnected when the device is to be operated by hand, as in the event of a power failure.

For operating the device by hand, a second bifurcated arm 96 is also attached to bellows member 73 and is connected by the link 97 to a knob 98 similar to knob 87 but fixed to the end of crank arm 99. The other end of link 97 may have a slot 94 adapted to fit over the bolt 96a in the bifurcated arm 96. A simple spring latch 95 operated by knob 95a may be used to hold link 96 in connected position. Crank arm 99 may be fixed to one end of the shaft 100 which is carried in suitable bearings 101, 102 that are mounted on the base 68. The other end of shaft 100 may have the hand lever 80 removably secured thereto in any desirable fashion for rotation of shaft 100. To facilitate the hand operation, crank arm 99 may have a spring 99a attached at one end to the bolt 99b and at the other end attached to the base 68.

To provide the vacuum producing device with the desired degree of adjustability, the housing member 63 is preferably provided with a port 103 fitted with a screen 104 and which may be closed by the valve 105. Valve 105 is fixed to one end of the arm 106 which has its other end supported for rotation about the bracket 107. Bracket 107 is supported by or may be formed as a part of the collar 65. When the device is producing a vacuum, the valve 105 will, of course, remain closed due to atmospheric pressure against its outer surface. When the device is not used to produce positive pressure, the valve 105 is capable of opening, so that this pressure will be ineffective, or if this positive pressure is to be transmitted to a respirator, the valve 105 may be clamped shut by means of the screw 108 bearing against the lug 109 on the arm 106.

For supplying the vacuum and/or pressure to the respirator, the bellows member 61 is provided with an outlet port to which is connected a pipe 110. A bleeder valve 111 may be connected to pipe 110 by means of the short conduit 112 held in place by clamps 113. The valve 111 comprises a flanged member 114 fixed to a conduit 115 which has portions cut out to provide openings 116 and an adjacent portion threaded as at 117 to receive a second flanged member 118. The openings 116 may be covered by a suitable screen 119. The flanged members 114 and 118 are complemental and provide together an opening 120 surrounding the openings 116 in the conduit 115. Member 114 may also have an annular flange 121 designed to fit into the groove 122 in member 118. The exterior of flanged member 118 may be provided with suitable notches 123 into which the spring detent 124 fixed to member 114 is adapted to drop to hold the two parts 114 and 118 in any adjusted position. By unscrewing the member 118 to any desired extent, an opening between the two flange members 114 and 118 is created, permitting a greater or lesser amount of air to flow into conduit 115 through the openings 116 from the atmosphere. The flexible hose 30 may be connected to the outer end of conduit 115.

In the operation of the vacuum device of Figures 16 to 18, motor 79 is connected directly to and drives the gear reducing unit 83, its speed being suitably adjusted by rotating the rheostat 81. As the shaft 85 of the gear reducing unit and the crank arm 86 are rotated at the desired speed, the crank arm through the link 90 causes the member 73 and the movable end of the bellows connected to it to reciprocate back and forth along the rod 69. During operation of the device by the motor, the link 97 may remain connected to the bifurcated member 96 or it may be disconnected and allowed to drop down to the full line position shown in Figure 16. When the device is operated by the hand lever 80, it is preferable to disconnect the link 90 from the bellows by rotating latch 93 and withdrawing pin 92.

Starting with the bellows in collapsed position it is expanded to the open position either by hand operation or the motor drive, and as the valve 105 is held tightly closed, suction is created through the flexible hose 30 withdrawing air from the respirator connected to the other end of this hose. The extent of the vacuum produced is easily regulated by rotating the flanged member 118 to allow the desired amount of air to leak into the conduit 115 from the atmosphere. For example, the flange member 118 may be rotated in accordance with the amount of vacuum indicated by the manometer 49 or other pressure indicating device (Figure 4) until the desired maximum vacuum inside the respirator is produced during each cycle. The screens 104, 119 and 47 prevent any insects or other foreign matter from getting inside the bellows and thus inside the respirator. When the bellows is moved in the opposite direction, that is from the expanded position to the collapsed position, the vacuum produced in the respirator drops quickly to atmospheric pressure, when the valve 105 opens to permit the escape of air which has leaked into the system during application of the vacuum.

In cases of complete paralysis of the chest muscles of the patient or in other instances, it may be desirable to close the valve 105 in the vacuum producing device by means of the screw 108, whereby positive pressure will be provided in the respirator during part of the cycle to force the chest wall down and cause the patient to forcibly expel air from the lungs. When the device is thus operated on alternating vacuum and positive pressure, air leaks into the system through valve 111 during one part of the cycle and out through this valve during the pressure period of the cycle. When it is desired to apply pressure to the patient, the respirator may be rocked so that the sealing means 36 or 52 at the upper portion thereof presses more tightly against the body to retard the escaping air during the application of the positive pressure. The sealing section 26 may be made to fit sufficiently snugly to prevent escape of too much air at the lower end. In some cases it may be desirable to insert a strip 50 between the back sections 27 which is tapered to be narrower at the lower end of the respirator than at the top in order to ensure a snug fit of the sealing section 26.

Figure 19:
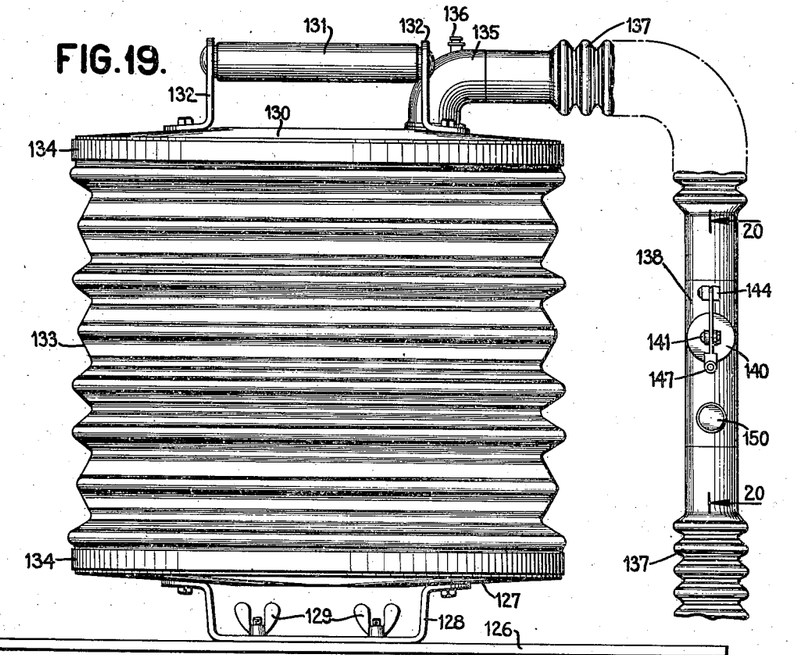
Figure 19 is a side elevation of a manually operable vacuum producing device for use with a respirator.
Figure 20:
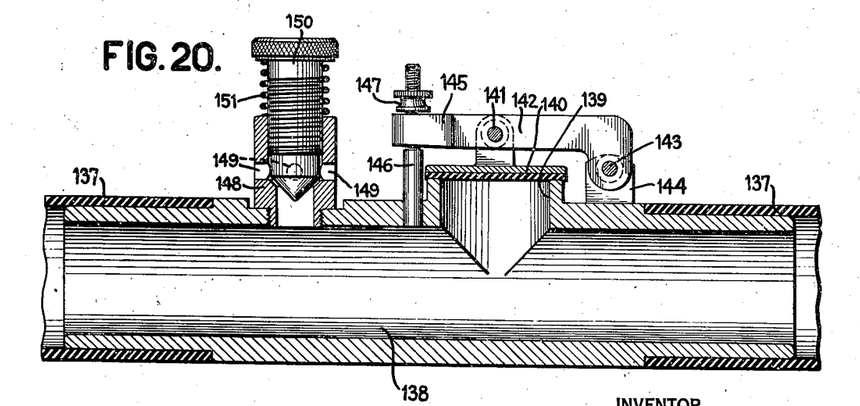
Figure 20 is a fragmentary sectional view taken on the line 20—20 of Figure 19.

In Figures 19 and 20, I have illustrated a manually operable vacuum producing device which comprises a rigid bar 126 designed to rest on the floor or ground and to be held down by the feet of the operator. One bellows end piece 127 having the bracket 128 bolted to it, may be secured to this bar by the wing nuts 129. The other bellows end piece 130 may have a suitable handle 131 secured thereto by means of the brackets 132. End pieces 127 and 130 are preferably connected by a molded rubber bellows 133 held in place by the metal clamping bands 134 and constructed as illustrated in Figures 16 to 18. The end piece 130 may have a pipe connection 135 opening into the interior of the bellows which is provided with a valve 136, if desired, for attachment of a manometer. Pipe section 135 may be connected directly to the respirator by means of a section of rubber bellows hose 137 similar to the hose 30, or a conduit 138, provided with suitable valve adjustments, may be connected to two sections of the rubber hose 137.

Conduit 138 may comprise, for example, a port 139 normally closed by a valve 140. Valve 140 may be pivotally connected as at 141 to a crank arm 142 which in turn is hinged as at 143 to a bracket 144 fixed to the conduit. The other end of crank arm 142 may be provided with a circular slot 145 adapted to fit over the post 146. Adjustment of the nut 147 thus serves to allow valve 140 to open or to hold the valve closed upon the building up of pressure inside the conduit 138. A second valve is preferably provided in this conduit 138 which may be formed with a valve seating member 148 provided with ports 149 open to the atmosphere and communicating with the interior conduit of 138. Valve stem 150 may be threaded into the valve seating member 148 and operable by hand to vary the amount of air allowed to leak into or out of conduit 138. A spring 151 may be employed around the body of the valve member 150, if desired, to hold it in any adjusted position.

In the operation of this manually operable vacuum producing device, the feet of the operator are placed on the ends of the rod 126, the handle 131 is grasped, and the bellows then alternately expanded and contracted by lifting and lowering the handle 131 at the desired rate. Valve member 140 operates in a manner similar to the valve 105 to provide only for the application of vacuum to the respirator, or when clamped in a closed position to provide alternately vacuum and positive pressure in the respirator. Adjustment of the needle valve 150 affords a means of regulating the degree of vacuum produced within the respirator.

The molded rubber bellows 76 or the bellows 133 may advantageously have a graduated wall thickness with the thinnest portion in the middle and becoming thicker towards each end. In addition, it may be desirable to form the bellows wall so that its outer surface is generally concave, as would be generated by rotation of an arc about the main axis of the bellows. This provides a gradual application of the change in pressure to the patient with less shock to the system and consequently greater comfort.

Respirating apparatus in accordance with my invention is designed to be light in weight and is useful not only in cases of paralysis of the chest muscles from administration of a spinal anaesthetic or from diseases such as infantile paralysis, but also for the resuscitation of victims of drowning or an electric shock. The hand operated vacuum producing device in conjunction with the light weight of the respirator makes the apparatus easily portable so that its use is not confined to hospitals. In addition, the apparatus may be quickly adjusted and is easy to operate.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Apparatus for producing artificial respiration comprising an enclosure for the chest of a patient having a substantially rigid front portion spaced from the chest and a flexible back portion secured thereto, means supporting said rigid portion and thereby said back portion so that said back portion may carry at least a portion of the weight of the patient, and sealing means at each end of said enclosure.

2. Apparatus for inducing and maintaining respiration comprising an enclosure for the chest and at least a portion of the abdomen of a patient shaped to be spaced therefrom and having a substantially rigid chest portion, a flexible resilient band adapted to be conformed to the skin of the patient around the abdomen and an intermediate semi-rigid portion between said rigid portion and said flexible band, a flexible resilient back secured to said portions at the sides thereof, means fitting the body of the patient for sealing the upper end of said enclosure, means supporting said rigid and semi-rigid portions and thereby said back so that at least a part of the weight of the patient is suspended therefrom in the flexible back of the enclosure, and means permitting withdrawal of air from within said enclosure.

3. Apparatus for producing artificial respiration comprising an enclosure for the chest of a patient having a substantially rigid front portion spaced from the chest and a flexible back portion secured thereto, means supporting said rigid portion and thereby said back portion, sealing means at each end of said enclosure for sealing the enclosure only when air is withdrawn therefrom, and means for periodically withdrawing air from said enclosure including a flexible member in the shape of a bellows.

4. A process of applying artificial respiration comprising enclosing the chest within an enclosure having a substantially rigid front portion spaced from the chest and a flexible back portion secured thereto for supporting at least a portion of the weight of the chest, withdrawing air from the enclosure to produce a partial vacuum therein and expand the chest, supplying air to the enclosure to restore the pressure therein to substantially atmospheric pressure, and alternately repeating said withdrawing and supplying of air.

5. Artificial respiration apparatus comprising an enclosure for surrounding the chest of a patient including a substantially rigid front chest portion, a flexible back portion secured thereto in such a manner as to support at least a portion of the weight of a patient, means at the ends of said enclosure arranged to be pressed against the patient's body and form a seal for said enclosure only when air is withdrawn therefrom, and means for supporting said substantially rigid portion to prevent substantial movement thereof towards the chest of a patient.

6. Artificial respiration apparatus comprising an enclosure for surrounding the chest of a patient including a substantially rigid front chest portion, a flexible back portion secured thereto in such a manner as to support at least a portion of the weight of a patient, means at the ends of said enclosure arranged to be pressed against the patient's body and form a seal for said enclosure only when air is withdrawn therefrom, and adjustable clamps for securing said substantially rigid portion in any one of a plurality of different fixed positions with respect to a support for the patient.

7. Artificial respiration apparatus comprising an enclosure for surrounding the chest of a patient including a substantially rigid front chest portion, a flexible back portion secured thereto in such a manner as to support at least a portion of the weight of a patient, means comprising soft flexible resilient members at the ends of said enclosure arranged to conform to the shape of the patient's body and form a seal for the enclosure when air is withdrawn therefrom, and means for holding said chest portion in a relatively fixed position relative to a support for a patient's body.

8. Artificial respiration apparatus comprising an enclosure for surrounding the chest of a patient including a substantially rigid front chest portion, a flexible back portion secured thereto composed of longitudinally extending sections removably held together by closure means, sealing means at the ends of the enclosure for providing a seal only when air is withdrawn from the enclosure, and means for supporting said chest portion to prevent substantial downward movement thereof relative to the chest of a patient in the enclosure.

9. Artificial respiration apparatus comprising an enclosure for surrounding the chest of a patient including a substantially rigid front chest portion, a flexible back portion composed of at least three longitudinally extending sections removably held together by slide fasteners and secured to the chest portion so as to support at least a portion of the weight of a patient's body, sealing means at the ends of the enclosure, and means for supporting said chest portion to prevent substantial downward movement thereof relative to the chest of a patient in the enclosure.

10. Apparatus for inducing and maintaining respiration comprising an enclosure for the chest of a patient having a substantially rigid front portion adapted to be spaced from the chest, a back portion secured thereto, flexible sealing means at each end of the enclosure for forming seals by conforming to the body of the patient only when air is withdrawn from the enclosure, and means for withdrawing air from said enclosure.

11. Apparatus for inducing and maintaining respiration comprising an enclosure for the chest of a patient having a substantially rigid front portion adapted to be spaced from the chest, a back portion secured thereto, soft flexible pads connected to each end of the enclosure for forming seals by conforming to the body of the patient when air is withdrawn from the enclosure but permitting air introduced into the enclosure under pressure to escape therefrom, and means for withdrawing air from and supplying air to said enclosure.

DENNIS R. SCANLAN.